United States Patent [19]

Kuipers et al.

[11] Patent Number: 5,280,735
[45] Date of Patent: Jan. 25, 1994

[54] TWO PIECE SLIP RESISTANT GRIP

[76] Inventors: Raymond J. Kuipers; Dominica R. Kuipers, both of 27312 Via Segundo, Mission Viejo, Calif. 92691

[21] Appl. No.: 877,081

[22] Filed: May 1, 1992

[51] Int. Cl.⁵ .............................................. B62K 21/26
[52] U.S. Cl. ................................ 74/551.9; 74/551.8; 74/557; 74/558; 24/279; 403/344
[58] Field of Search .................... 74/551.8, 551.9, 557, 74/558; 403/344; 24/274 WB, 279

[56] References Cited

U.S. PATENT DOCUMENTS

| | | | |
|---|---|---|---|
| 4,380,093 | 4/1983 | Morgan | 74/551.9 X |
| 4,416,166 | 11/1983 | Jannard et al. | 74/551.9 |
| 4,452,289 | 6/1984 | Smith | 74/551.9 X |
| 4,535,649 | 8/1985 | Stahel | 74/551.9 |
| 4,799,668 | 1/1989 | Jansen | 74/551.9 X |
| 4,895,044 | 11/1990 | Ekins | 74/551.9 |
| 4,941,232 | 7/1990 | Decker et al. | 74/551.9 X |
| 4,964,192 | 10/1990 | Marui | 74/551.9 X |
| 4,972,733 | 11/1990 | Olmr et la. | 74/551.9 |
| 5,096,327 | 3/1992 | Ruland | 24/279 X |
| 5,125,286 | 6/1992 | Wilson | 74/551.9 |

FOREIGN PATENT DOCUMENTS

| | | | |
|---|---|---|---|
| 0043230 | 1/1982 | European Pat. Off. | 74/551.9 |
| 964380 | 5/1957 | Fed. Rep. of Germany | 74/551.9 |
| 681174 | 6/1965 | Italy | 403/344 |
| 2-21028 | 1/1990 | Japan | 403/344 |
| 90162 | 10/1957 | Norway | 74/551.9 |
| 18662 | of 1891 | United Kingdom | 403/344 |
| 19602 | of 1893 | United Kingdom | 74/551.9 |
| 20374 | of 1893 | United Kingdom | 74/551.9 |

Primary Examiner—Leslie A. Braun
Assistant Examiner—David E. Henn

[57] ABSTRACT

A two piece grip which can be securely attached to a bearing surface. The grip has substantially reduced relative slippage between the grip and the bearing surface. The grip utilizes a two piece construction which comprises a substantially pliable inner sleeve and a substantially rigid outer housing. The outer housing applies force to the inner sleeve to prevent it from rotating on the bearing surface. The pliable inner sleeve absorbs a substantial amount of vibrations and comprises a high tactile material to provide ease of gripping. The two piece invented grip may be repeatedly attached and removed from a bearing surface without causing substantial damage to the grip.

17 Claims, 4 Drawing Sheets

TWO PIECE SLIP RESISTANT GRIP

BACKGROUND

1. Field of Invention

The invention relates to grips used with recreational vehicles, such as bicycles and the like, and more particularly, to a two piece slip resistant grip.

2. Description of Prior Art

Grips are commonly used for shock absorption and adhesion of a users hands to such recreational vehicles as bicycles and motorcycles. A substantial portion of these grips in use today comprise a basic configuration. This configuration is typically solid rubber, cylindrical in shape, and smaller in diameter than a bearing surface, such as a handlebar of a bicycle, for example. The grip is affixed to the handlebar, by stretching its interior diameter as the grip is slipped over the handlebar.

A multiplicity of grips used on handlebars are designed to be manufactured as a one piece construction. The applications of these grips demand that the grip material must be soft enough to absorb some shock, such as road vibrations, but stiff enough to retain the shape of the grip, so that the user can maintain a positive grasp on the grip. These grips typically have a covered end to enclose an open end of the handlebar.

A problem with these grips is that they do not adhere sufficiently to the handlebar, thus allowing relative slippage between the grip and the handlebar. The grip may even slide outwardly on the handlebar, resulting in the grip eventually falling off the handlebar.

In an attempt to eliminate the problem of relative slippage between the grip and the handlebar, prior art grips have been either glued or wired to the handlebar. If a glued grip is to be removed after being glued to the handlebar, the grip must be cut off the handlebar. This destroys the glued grip and necessitates the use of a new grip to replace the destroyed one.

A problem with a wired grip is that it must be wired tightly to the handlebar. In time, the wire tends to cut through the grip, thus destroying the grip. A further problem with a wired grip, is that the wire may cut the users hands.

A further disadvantage of prior art grips is that their ends are relatively thin. When the grips are affixed to a hollow bearing surface, such as a handlebar of a bicycle, for example, and the handlebar is dropped on a hard surface, an end of the handlebar may push through the thin end of the grip, much like a cookie cutter through cookie dough, thus destroying the grip.

Grips similar to those discussed above are disclosed in U.S. Pat. Nos. 4,972,733; 4,964,192; and 4,380,093.

An alternative grip utilizes a hard, rubber sleeve with foam affixed to its exterior periphery, by gluing, for example. The grip is slip-fitted onto the handlebar and an internal expansion plug inserted through the grip and into a hollow end of the handlebar, which is located at the outer end of the grip. The expansion plug is then tightened and the grip is secured at one end to the handlebar. This alternative grip is only secured on the outer end of the handlebar, leaving an interior portion of the grip somewhat unstable. Users find this type of grip unsatisfactory, firstly because the foam tends to separate from the hard rubber sleeve, and secondly, the interior portion is subject to relative slippage to the handlebar. Motorcycles, with a twist throttle end, cannot utilize this alternative grip affixed to the throttle end, because it may lock the throttle into a single position. A grip similar to the above discussed grip is disclosed in U.S. Pat. No. 4,535,649.

OBJECTS OF THE INVENTION

It is therefore an object of the present invention to provide an improved grip;

It is another object of the invention to provide a grip having greatly diminished relative slippage between a bearing surface and the grip when a torque force is applied to the grip;

It is a further object of the invention to provide a grip which is easily removable from a bearing surface;

It is yet another object of the invention to provide a grip which dampens vibrations transmitted by a bearing surface;

It is a still further object of the present invention to provide a grip which is relatively easy to grasp; and It is another object of the present invention to provide a grip which may be removed from a bearing surface and affixed to another bearing surface repeatedly.

SUMMARY OF THE INVENTION

These and other objects and advantages of the present invention are achieved by providing an improved grip which can be securely attached to a bearing surface such as a handlebar. The invented grip has substantially reduced relative slippage between the grip and the bearing surface. The grip utilizes a two piece construction which comprises a substantially pliable inner sleeve and a substantially rigid outer housing. The outer housing applies a force to the inner sleeve which applies a holding force to the bearing surface when the grip is mounted to the bearing surface, to prevent it from rotating on the bearing surface. The pliable inner sleeve absorbs a substantial amount of vibrations from the bearing surface and comprises a high tactile material to provide ease of gripping thereof. The invented grip may be repeatedly attached and removed from a bearing surface without causing substantial damage to the grip.

DRAWING FIGURES

Further objects and advantages of the present invention will become readily apparent from the ensuing detailed description taken in conjunction with the accompanying drawings, and in which.

Figure 6:
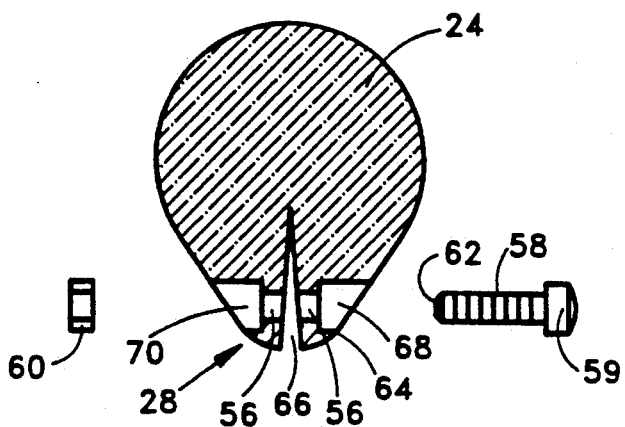
Figure 7:
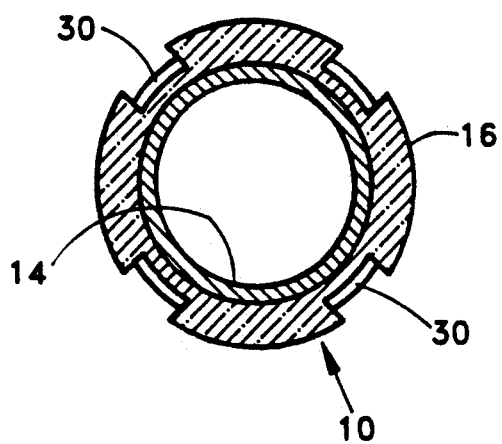

FIG., 5 is a front view of the present invention showing a first fastener in phantom;

FIG. 6 is a rear view of the present invention showing a second fastener in phantom; and FIG. 7 is a cross-sectional view showing the present invention mounted on a handlebar.

DETAILED DESCRIPTION

The following description sets forth the best modes contemplated by the inventors to make and use their invented grip on a production basis. Various modifications, however, will become readily apparent to those skilled in these arts, and are anticipated by the spirit and scope of the present invention.

Figure 1:
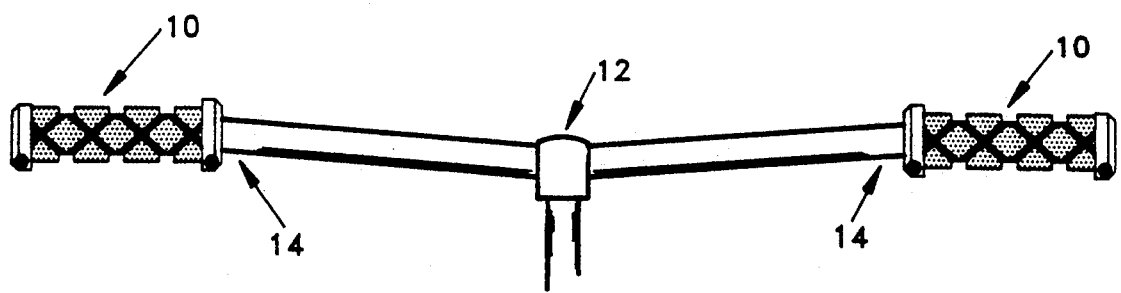
FIG. 1 is a front view of a handlebar having a two piece grip constructed according to the principles of the present invention affixed to either end thereof.

Referring now to FIG. 1, a pair of grips 10 constructed according to the principles of the present invention, are shown affixed to a bearing surface which comprises a handlebar 12. The grips 10 are affixed to ends 14 of the handlebar 12. The handlebar 12 may be attached to any suitable recreational vehicle, such as a bicycle, motorcycle, or a personal watercraft (not shown).

Figure 2:
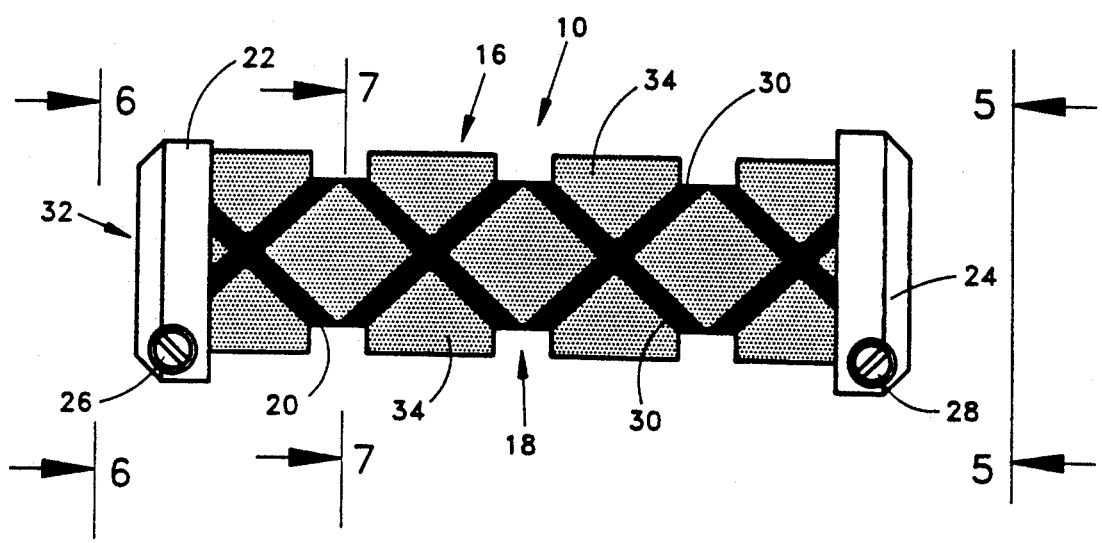
FIG. 2 is a side view of the invented two piece grip.

Referring now to FIG. 2, there is shown a side view of a preferred embodiment of the invented grip 10. The grip 10 comprises a cylindrical inner sleeve 16 and an outer housing member 18.

The housing member 18 includes a cylindrical body 20, an annular flange end 22, and an end cap 24. The body 20 comprises a plurality of supports 30 fabricated in a lattice configuration. The flange end 22 has an aperture 32 disposed therethrough with a diameter substantially equal an inner diameter of the body 20. A first fastening means 26 is disposed through the flange end 22 and a second fastening means 28 is disposed through the end cap 24.

The inner sleeve 16 has a multiplicity of spatially positioned, substantially square protrusions 34. The protrusions 34 extend between the supports 30, through the housing member's body 20.

Figure 3:
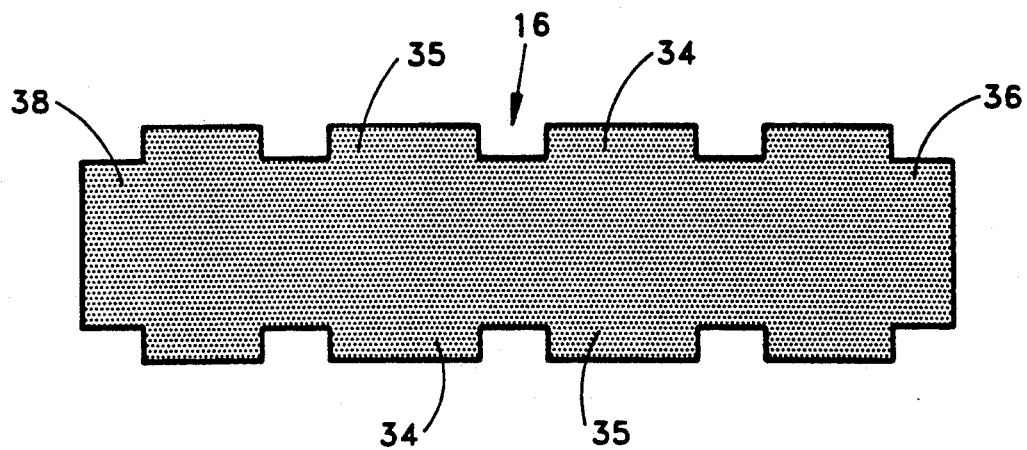
FIG. 3 is a side view of an inner sleeve of the present invention.

Referring now to FIG. 3, there is shown a side view of the cylindrical inner sleeve 16. The inner sleeve 16 may be substantially 4.5 inches in length, for example. The inner sleeve 16 may be fabricated with different inner diameters, depending upon the desired application of the grip 10. The inner sleeve's 16 inner diameter should be slightly less than an outer diameter of a handlebar 14 the grip 10 is to be mounted on. In the preferred embodiment, the inner diameter is substantially ⅞ inch.

The inner sleeve 16 has a outer end portion 36 and an inner end portion 38. The outer end portion 36 is substantially ¼ inch in length and the inner end portion 38 is substantially ⅜ inch in length. The multiplicity of substantially square, spatially position protrusions 34 extend along the inner sleeve 16, between the inner end portion 38 and the outer end portion 36. The protrusions 34 project outwardly from inner sleeve 16 and are substantially ¼ inch in height. Spaces 35 are provided between the protrusions 34, to accommodate the housing member's supports 30.

The inner sleeve 16 may comprise any suitable pliable, tactile rubber, or silicone. In the preferred embodiment, the inner sleeve 16 is comprised of Kraton ®, as manufactured by Shell Chemical Company.

Figure 4:
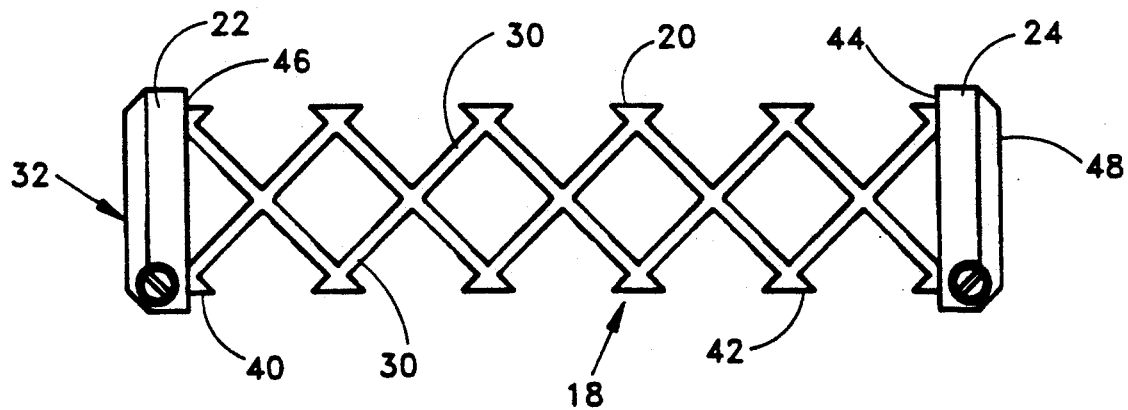
FIG. 4 is a side view of a housing member of the present invention.

Referring now to FIG. 4, of the drawings, the housing member 18 may be substantially 4.5 inches in length, for example. The housing member 18 may comprise a suitable injection molded, semi-rigid nylon, for example. The body 20 is substantially equal in length to the length of the protrusions 34 of the inner sleeve 16. The body 20 has an inner diameter sized to be tight on the exterior periphery of the inner sleeve 16, when the housing member 18 is coupled to the inner sleeve 16. The body 20 comprises a plurality of supports 30 fabricated in a lattice configuration. The supports 30 are designed to reside in the spaces 35 between the protrusions 34, of the inner sleeve 16, when the inner sleeve 16 is coupled to the housing member 18.

The annular flange end 22 is made integral with an inner end 40 of the body 20, and the end cap 24 is made integral with an outer end 42 of the body 20. The flange end 22 has an outer diameter of substantially 1.75 inches and an inner periphery 46 of substantially 1.25 inches. The inner periphery 46 of the flange end 22 is substantially equal in diameter to an outer diameter of the protrusions 34.

The end cap 24 has an inner periphery 44 large enough to accommodate the outer diameter of the protrusions 34. The end cap 24 includes a substantially thick convex portion 48. The convex portion 48 of the end cap 24 is solid, which results in its substantial thickness.

Figure 5:
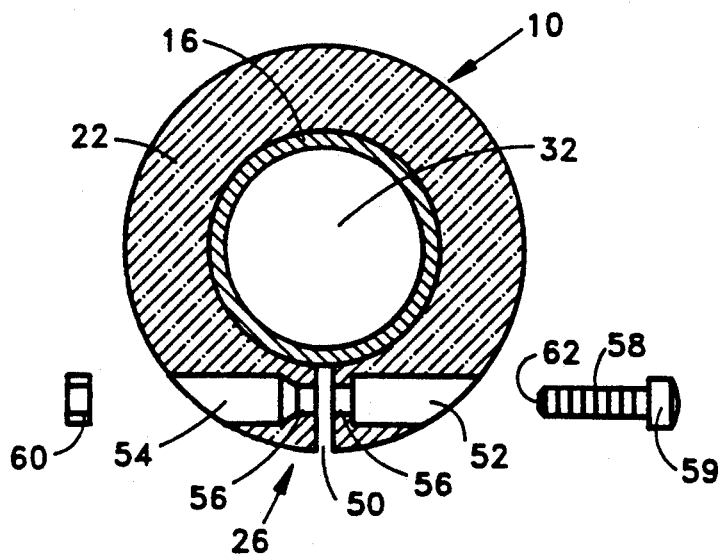

FIG. 5, shows an end view of the invented grip 10. The flange end 22 has a split 50 extending therethrough. The first fastening means 26 comprises a first cavity 52 and a complementary cavity 54, which are disposed in the periphery of the flange end 22. Each cavity 52, 54 has an opening 56 which extends into the split 50.

A screw 58 having a head 59 with a diameter substantially equal to the diameter of the desired cavity 52, 54, is adapted to be disposed through either of the cavities 52, 54, through the opening 56 and split 50, and into the remaining cavity 52, 54. The head 59 of the screw 58 may have an alien head configuration, for example. A nut 60, having an outer diameter substantially equal to the diameter of the desired cavity 52, 54, may be threaded onto an end 62 of the screw 58, which extends through the opening 56 and into the remaining cavity 52, 54. As the nut 60 is tightened on the screw 58, and against the opening 56, the width of the split 50 is reduced, thus reducing the diameter of the flange end 22. As the diameter of the flange end 22 is reduced a gripping force is applied to the inner sleeve 16, for preventing the grip 10 from rotating on the handlebar 14.

Referring now to FIG. 6, the end cap 24 of the housing member 18 is shown. In the preferred embodiment, the end cap 24 includes an elliptical area 64. The second fastening means 28 extends through the elliptical area 64 of the end cap 24. A crevice 66 extends inwardly from an apex of the elliptical area 64 towards the center of the end cap 24.

The second fastening means 28 comprises a first end cap cavity 68 and a complementary end cap cavity 70, which extend into the periphery of the elliptical area 64 of the end cap 24. The end cap cavities 68, 70 have diameters substantially equal to the diameters of the cavities 52, 54 of the first fastening means 26. The end cap cavities 68, 70 have an opening 56 extending therebetween and into the crevice 66.

A screw 58 having a head 59 with a diameter substantially equal to the diameter of the desired end cap cavity 68, 70, is adapted to be disposed through either of the end cap cavities 68, 70, through the opening 56 and crevice 66, and into the remaining end cap cavity 68, 70. A nut 60, having an outer diameter substantially equal to the diameter of the desired end cap cavity 68, 70, may be threaded onto the end 62 of the screw 58 which extends through the opening 56 and into the remaining cavity 68, 70. As the nut 60 is tightened on the screw 58, and against the opening 58, the width of the crevice 66 is reduced, thus reducing the diameter of the end cap 24.

FIG. 7 shows a cross-sectional view of the present invention 10 mounted on a bearing surface, such as a handlebar 14. The inner sleeve 16 surrounds the periphery of the handlebar 14, when the grip is affixed to the handlebar 14. The housing member's supports 30 extend about the outer periphery of the inner sleeve 16, and exert a gripping force on the inner sleeve 16, which exerts a holding force on the handlebar 14 to prevent the grip 10 from rotating on the handlebar 14.

With reference to the drawing figures, the substantial pliability of the inner sleeve 16 enables compression of the inner sleeve 16, for reducing the outer and inner diameter of the inner sleeve 16. The invented two piece grip 10 is assembled by compressing the inner sleeve 16, then inserting the outer end portion 36 of inner sleeve 16, into the aperture 32 of the housing member's flanges end 22. The inner sleeve 16 is pushed into the housing member's body 20, until the inner sleeve's outer end portion 36 abuts of the end cap's convex end 48. The inner sleeve 16 may need to be rotated within the housing member's body 20, so that the protrusions 34 extend outwardly between the body's supports 30.

Once the inner sleeve 16 is securely placed in the housing member 18, the grip 10 may be mounted on the handlebar 14. The flange end 22 is first slid onto the handlebar 14, with inner periphery of the inner sleeve 16, extending around the outer periphery of the handlebar 14. The grip 10 is slid onto the handlebar 14, until an outer end (not shown) of the handlebar 14 abuts the end cap's convex end 48. The nuts 60 are then tightened on the screws 58 of the first and second fastening means 26, 28, thus reducing the diameters of the flange end 22 and the end cap 24.

The housing member's body 20 is sized so that it exerts a gripping force on the outer periphery of the inner sleeve 16, so that the inner sleeve exerts a holding force on the handlebar 14 to prevent the grip 10 from rotating on the handlebar 14, when mounted on the handlebar 14. As the diameters of the flange end 22 and the end cap 24 are reduced, force is applied inwardly on the inner end portion 38 and the outer end portion 36 of the inner sleeve 16, to further insure that the grip 10 does not rotate on the handlebar 14.

Thus there has been disclosed an improved two piece grip which can be securely attached to a bearing surface, such as a handlebar. The grip utilizes a two piece construction which comprises a substantially pliable inner sleeve and a substantially rigid outer housing. The grip has substantially reduced relative slippage between the grip and the handlebar, due to the holding force applied to the handlebar by the invented grip. The outer housing applies a gripping force to the inner sleeve, and the inner sleeve applies a holding force to the handlebar, or other bearing surface, to prevent the grip from rotating on the handlebar. The pliable inner sleeve absorbs a substantial amount of vibrations and comprises a high tactile material to provide ease of grasping the invented grip. The two piece grip may be repeatedly attached and removed from a handlebar, without causing substantial damaged to the grip.

While the above detailed description discusses method, means, and an improved two piece slip resistant grip, various modifications to the present invention, however, will be readily apparent to those skilled in the art without departing from the spirit and scope of the present invention.

What is claimed is:

1. A grip comprising;
    a pliable cylindrical inner sleeve, said sleeve having a multiplicity of spatially positioned protrusions extending outwardly from an exterior periphery thereof, said protrusions extending along the exterior periphery of said inner sleeve from a first end region towards a second end region;
    a rigid cylindrical outer housing member adapted to be coupled to the exterior periphery of said inner sleeve, said housing member comprising a body portion having an end cap at a first end thereof, said end cap adapted to receive the first end region of said inner sleeve and a flange end at a second end thereof, said flange end adapted to receive the second end region of said inner sleeve, said body portion having a multiplicity of openings disposed therethrough complementary to the protrusions of said inner sleeve, such that the protrusions extend through said body portion when said housing member is coupled to the exterior periphery of said inner sleeve, said flange end having an aperture disposed therethrough adapted to receive said inner sleeve; and
    means for reducing a diameter of said flange end and for reducing a diameter of said end cap.

2. The grip of claim 1 wherein the flange end of said housing member has a split extending across a width thereof, the flange end further including a first cavity disposed in an exterior periphery thereof perpendicular to said split and a second cavity disposed in the exterior periphery of the flange end opposite to the first cavity and perpendicular to said split, said flange end further including a passage extending between the first and second cavities and into said split, said flange end further including fastening means adapted to reside in said first and second cavities for reducing the width of said split for reducing the diameter of said flange end.

3. The grip of claim 2 wherein said fastening means comprises a screw adapted to reside in a desired one of said first and second cavities with a portion thereof extending through said passage and into a remaining one of said first and second cavities and a nut adapted to be disposed into said remaining one of said first and second cavities and threaded onto the portion of the screw extending into said remaining one of said first and second cavities, whereby the nut is tightened on the screw reducing the width of said split thus reducing the diameter of said flange end.

4. The grip of claim 1 wherein said end cap has a crevice extending inwardly from an exterior periphery thereof towards a center of said end cap, said end cap having a first cavity disposed in the exterior periphery thereof perpendicular to said crevice and a second cavity disposed in the exterior periphery thereof opposite to the first cavity and perpendicular to said crevice, said end cap further including a passage extending between the first and second cavities and into said crevice, said end cap further including fastening means adapted to reside in said first and second cavities for reducing a width of said crevice for reducing the diameter of said end cap.

5. The grip of claim 4 wherein said fastening means comprises a screw adapted to reside in a desired one of said first and second cavities with a portion thereof extending through said passage and into a remaining one of said first and second cavities and a nut adapted to be disposed into the remaining one of said first and second cavities and threaded onto the portion of the screw extending into said remaining one of said first and second cavities, whereby the nut is tightened on the screw reducing the width of said crevice thus reducing the diameter of said end cap.

6. The grip of claim 1 wherein said body portion comprises a lattice configuration, said lattice configuration forming a multiplicity of spatially positioned, substantially square openings with supports extending therebetween.

7. The grip of claim 6 wherein said protrusions of said inner sleeve are substantially square and extend through said openings in said body portion formed by said lattice configuration.

8. The grip of claim 1 wherein said housing member comprises an injection molded nylon.

9. The grip of claim 1 wherein said inner sleeve comprises a tactile rubber.

10. A grip for mounting on a cylindrical bearing surface comprising;
   a cylindrical inner sleeve comprising a tactile rubber, said inner sleeve having an inner diameter less than an outer diameter of said bearing surface for exerting a holding force on said bearing surface for preventing said grip from rotating on said bearing surface when mounted thereon, said inner sleeve having an multiplicity of spatially positioned protrusions extending outwardly from an exterior periphery thereof, said protrusions extending along the exterior periphery of said inner sleeve from a first end region towards a second end region;
   a rigid cylindrical outer housing member adapted to be coupled to the exterior periphery of said inner sleeve, said housing member comprising a body portion having an inner diameter less than a diameter of the exterior periphery of said inner sleeve for exerting a gripping force on said inner sleeve when coupled thereto, said body portion having a multiplicity of openings disposed therethrough complementary to the protrusions on said inner sleeve, such that said protrusions extend through said body portion when said housing member is coupled to the exterior periphery of said inner sleeve;
   a thick end cap made integral at a first end of the body portion of said housing member, said end cap adapted to receive the first end region of said inner sleeve, said end cap having an elliptical configuration with a crevice extending inwardly from an apex of the elliptical configuration towards a center of said end cap, said end cap having a first cavity disposed in an exterior periphery thereof perpendicular to said crevice and a second cavity disposed in the exterior periphery of the elliptical configuration opposite to the first cavity and perpendicular to said crevice, said end cap further including a passage extending between the first and second cavities and into said crevice, said first and second cavities adapted to receive fastening means for reducing a width of said crevice for reducing a diameter of said end cap; and
   a flange end made integral at a second end of the body portion of said housing member, said flange end adapted to coupled to the second end region of said inner sleeve, said flange end having an aperture disposed therethrough adapted to receive said inner sleeve and having a split extending across a width thereof, the flange end further including a first cavity disposed in an exterior periphery thereof perpendicular to said split and a second cavity disposed in the exterior periphery thereof opposite to the first cavity and perpendicular to said split, said flange end further including a passage extending between the first and second cavities and into said split, said first and second cavities adapted to receive fastening means for reducing a width of said split for reducing a diameter of said flange end, whereby the diameters of said end cap and said flange end are reduced to aid said housing member in exerting further gripping force on said inner sleeve thus aiding said inner sleeve to exert said holding force on said bearing surface for preventing said grip from rotating on said bearing surface.

11. The grip of claim 10 wherein said fastening means comprises a screw adapted to reside in a desired one of said first and second cavities with a portion thereof extending through said passage and into a remaining one of said first and second cavities and a nut adapted to be disposed into the remaining one of said first and second cavities and threaded onto the portion of the screw extending into said remaining one of said first and second cavities, whereby the nut is tightened on the screw reducing the width of a desired one of said split and said crevice thus reducing the diameter of a desired one of said flange end and said end cap.

12. The grip of claim 10 wherein said body portion comprises a lattice configuration, said lattice configuration forming a multiplicity of spatially positioned, substantially square openings with supports extending therebetween.

13. The grip of claim 12 wherein said protrusions of said inner sleeve are substantially square and extend through said openings in said body portion formed by said lattice configuration.

14. The grip of claim 10 wherein said housing member comprises an injection molded nylon.

15. The grip of claim 10 wherein said inner sleeve comprises Kraton.

16. A grip for mounting on a cylindrical bearing surface comprising;
   a cylindrical inner sleeve comprising a tactile rubber, said inner sleeve having an inner diameter less than an outer diameter of said bearing surface for exerting a holding force on said bearing surface for preventing said grip from rotating on said bearing surface when mounted thereon, said inner sleeve having a multiplicity of spatially positioned substantially square protrusions extending outwardly from an exterior periphery thereof, said protrusions extending along the exterior periphery of said inner sleeve from a first end region towards a second end region;
   a rigid outer housing member comprising injection molded nylon, said housing member adapted to be coupled to the exterior periphery of said inner sleeve, said housing member comprising a body portion having a cylindrical lattice configuration with an inner diameter less than a diameter of the exterior periphery of said inner sleeve for exerting a gripping force on said inner sleeve when said housing member is coupled to said inner sleeve, said lattice configuration having a multiplicity of supports forming a multiplicity of spatially positioned, substantially square openings complementary to the protrusions on said inner sleeve, such that said protrusions extend through said openings in said body portion when said housing member is coupled to the exterior periphery of said inner sleeve;
   a thick end cap made integral at a first end of the body portion of said housing member, said end cap adapted to receive the first end region of said inner sleeve, said end cap having an elliptical configuration with a crevice extending inwardly from an apex of the elliptical configuration towards a center of said end cap, said end cap having a first cavity disposed in an exterior periphery thereof perpendicular to said crevice and a second cavity disposed in the exterior periphery of the elliptical configuration opposite to the first cavity and perpendicular to said crevice, said end cap further including a passage extending between the first and second cavities and into said crevice, said first and second cavities adapted to receive fastening means for reducing a width of said crevice for reducing a diameter of said end cap; and a flange end made integral at a second end of the body portion of said housing member, said flange end adapted to couple to the second end region of said inner sleeve, said flange end having an aperture disposed therethrough adapted to receive said inner sleeve and having a split extending across a width thereof, the flange end further including a first cavity disposed in an exterior periphery thereof perpendicular to said split and a second cavity disposed in the exterior periphery thereof opposite to the first cavity and perpendicular to said split, said flange end further including a passage extending between the first and second cavities and into said split, said first and second cavities adapted to receive fastening means for reducing a width of said split for reducing a diameter of said flange end, whereby the diameters of said end cap and said flange end are reduced to aid said housing member in exerting further gripping force on said inner sleeve thus inducing said inner sleeve to exert said holding force on said bearing surface for preventing said grip from rotating on said bearing surface.

17. The grip of claim 16 wherein said fastening means comprises a screw adapted to reside in a desired one of said first and second cavities with a portion thereof extending through said passage and into a remaining one of said first and second cavities and a nut adapted to be disposed into the remaining one of said first and second cavities and threaded onto the portion of the screw extending into said remaining one of said first and second cavities, whereby the nut is tightened on the screw reducing the width of a desired one of said split and said crevice thus reducing the diameter of a desired one of said flange end and said end cap.

* * * * *